United States Patent
Hampton et al.

(10) Patent No.: US 10,308,356 B2
(45) Date of Patent: Jun. 4, 2019

(54) AXIAL SPRINGS FOR ROTOR HUB ASSEMBLY

(71) Applicant: Bell Helicopter Textron Inc., Fort Worth, TX (US)

(72) Inventors: Dalton T Hampton, Fort Worth, TX (US); Thomas Clement Parham, Jr., Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 228 days.

(21) Appl. No.: 15/359,594

(22) Filed: Nov. 22, 2016

(65) Prior Publication Data

US 2018/0141650 A1 May 24, 2018

(51) Int. Cl.
| | |
|---|---|
| *B64C 27/32* | (2006.01) |
| *B64C 27/35* | (2006.01) |
| *B64C 27/43* | (2006.01) |
| *B64C 27/78* | (2006.01) |
| *B64C 27/82* | (2006.01) |

(52) U.S. Cl.
CPC .............. *B64C 27/43* (2013.01); *B64C 27/32* (2013.01); *B64C 27/35* (2013.01); *B64C 27/78* (2013.01); *B64C 27/82* (2013.01)

(58) Field of Classification Search
CPC ......... B64C 27/32; B64C 27/35; B64C 27/43; B64C 27/78; B64C 27/82; F03D 1/00
See application file for complete search history.

(56) References Cited

U.S. PATENT DOCUMENTS

| | | | | |
|---|---|---|---|---|
| 3,804,552 | A | * | 4/1974 | Covington .............. B64C 27/35 416/134 A |
| 3,932,059 | A | | 1/1976 | Rybicki |
| 4,333,728 | A | * | 6/1982 | Drees ...................... B64C 27/43 416/134 A |
| 6,764,280 | B2 | * | 7/2004 | Sehgal .................... B64C 27/35 416/104 |
| 2002/0136636 | A1 | | 9/2002 | Sehgal et al. |
| 2015/0175259 | A1 | | 6/2015 | Foskey et al. |
| 2015/0239555 | A1 | | 8/2015 | Foskey et al. |
| 2015/0284077 | A1 | | 10/2015 | Loftus et al. |

OTHER PUBLICATIONS

European Search Report; Application No. EP 17191972.3; European Patent Office; dated Apr. 4, 2018.

* cited by examiner

*Primary Examiner* — Richard A Edgar
*Assistant Examiner* — Elton K Wong
(74) *Attorney, Agent, or Firm* — Lawrence Youst PLLC

(57) ABSTRACT

A rotor hub assembly for a rotorcraft includes a yoke forming a bearing bore. The yoke has a teetering axis extending through the bearing bore. The rotor hub assembly includes a flapping bearing disposed in the bearing bore. The flapping bearing is operable to regulate teetering of the yoke about the teetering axis. The rotor hub assembly includes an axial spring abutting the flapping, thereby reducing movement of the flapping bearing along the teetering axis.

15 Claims, 6 Drawing Sheets

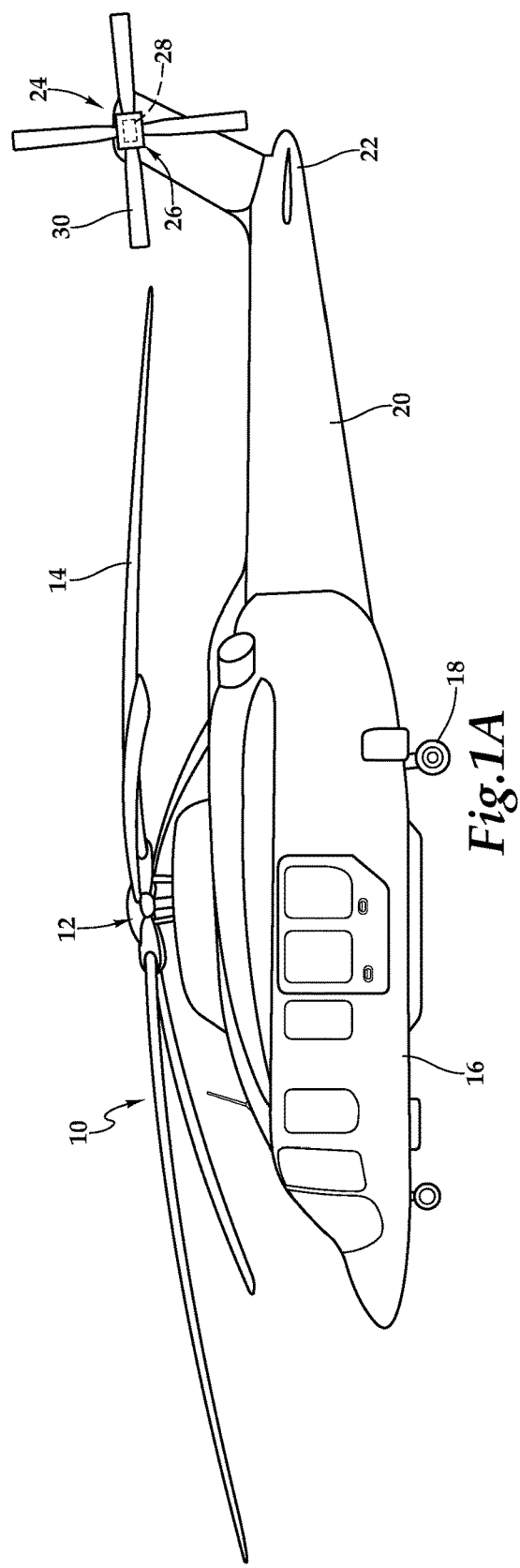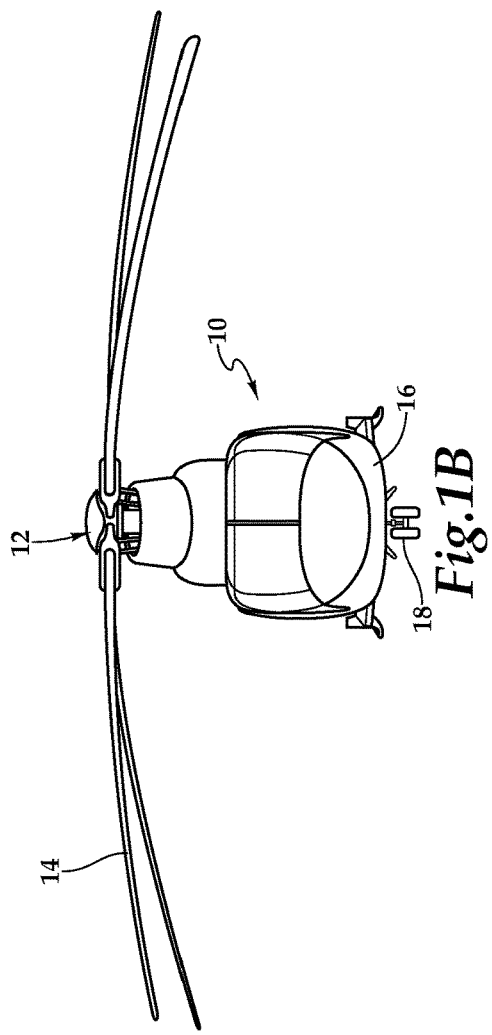

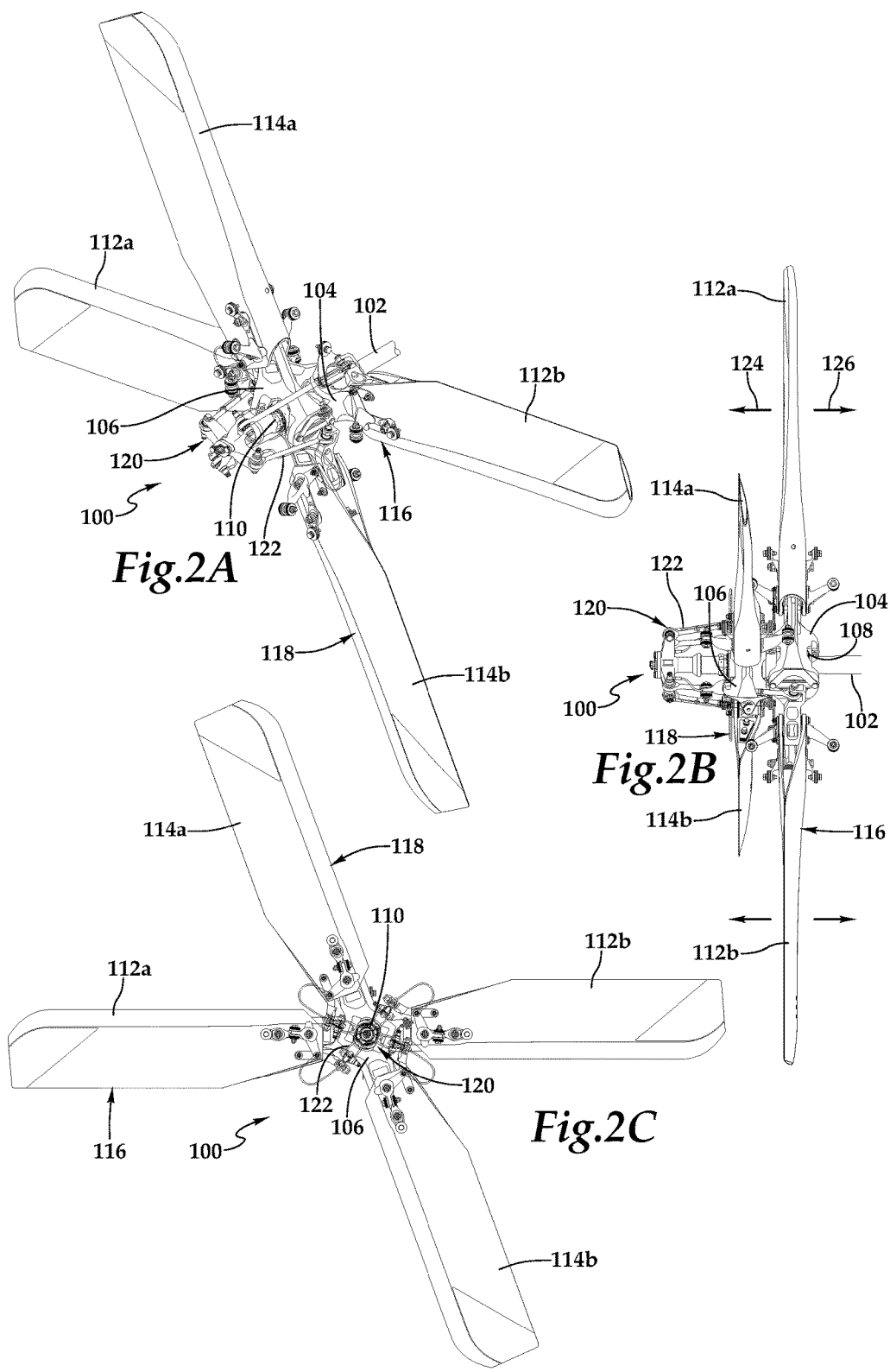

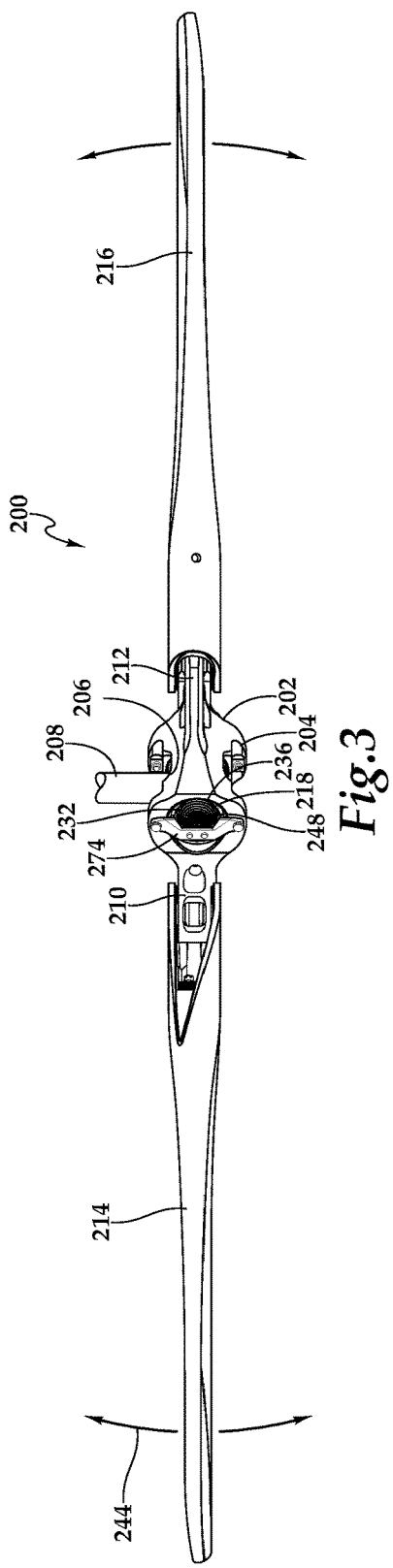
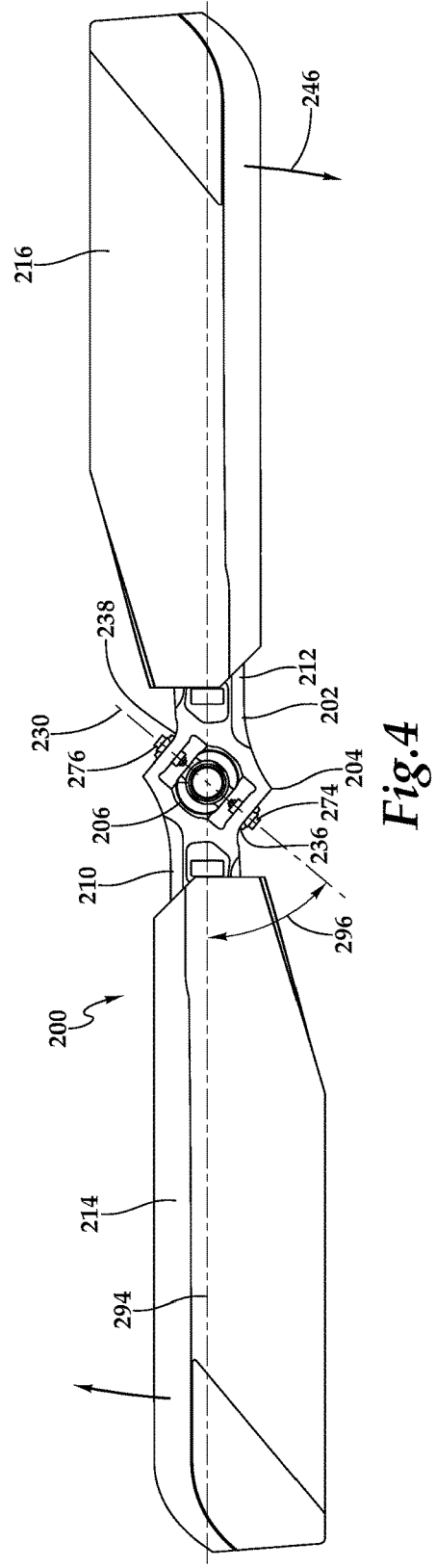

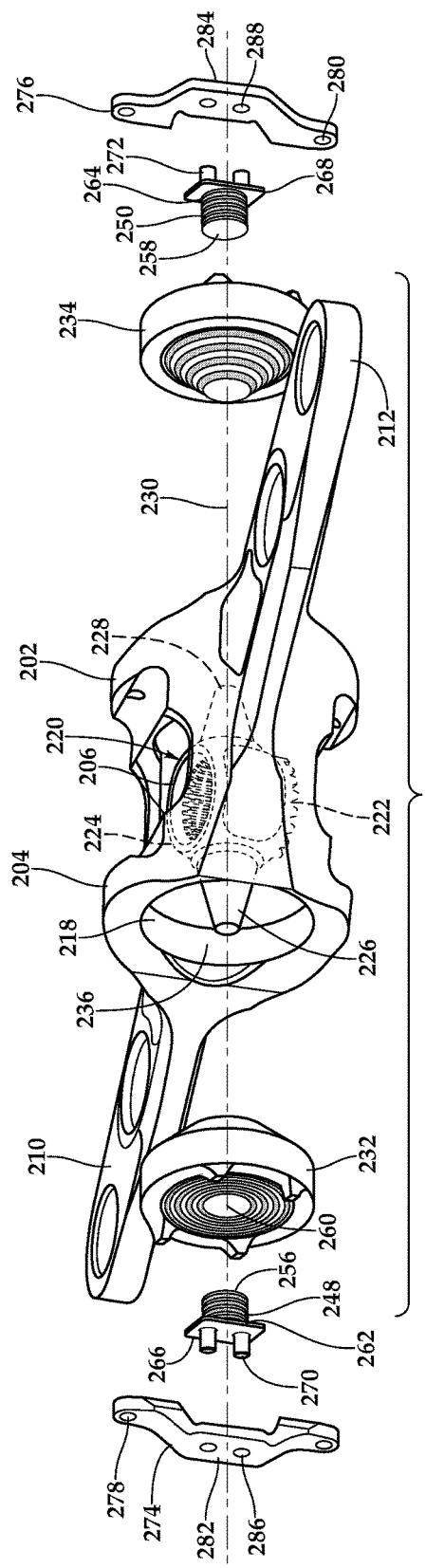
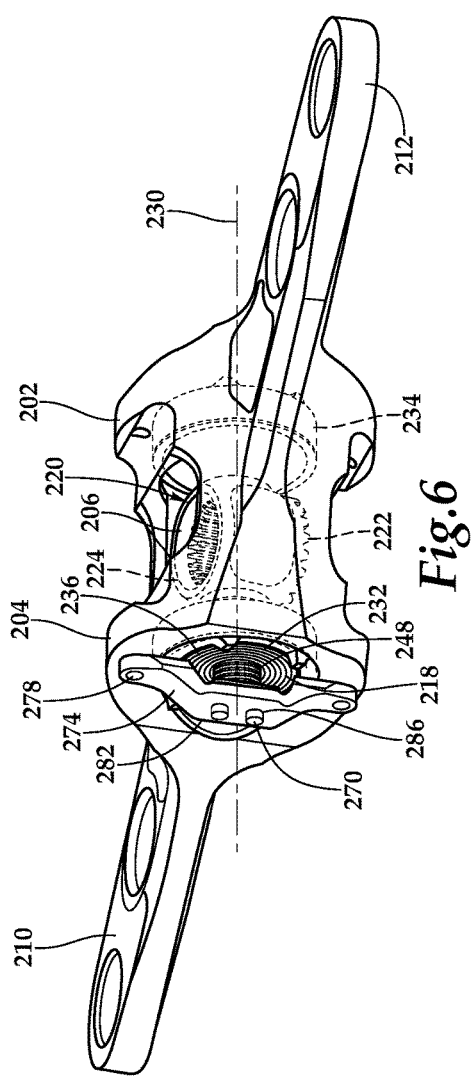

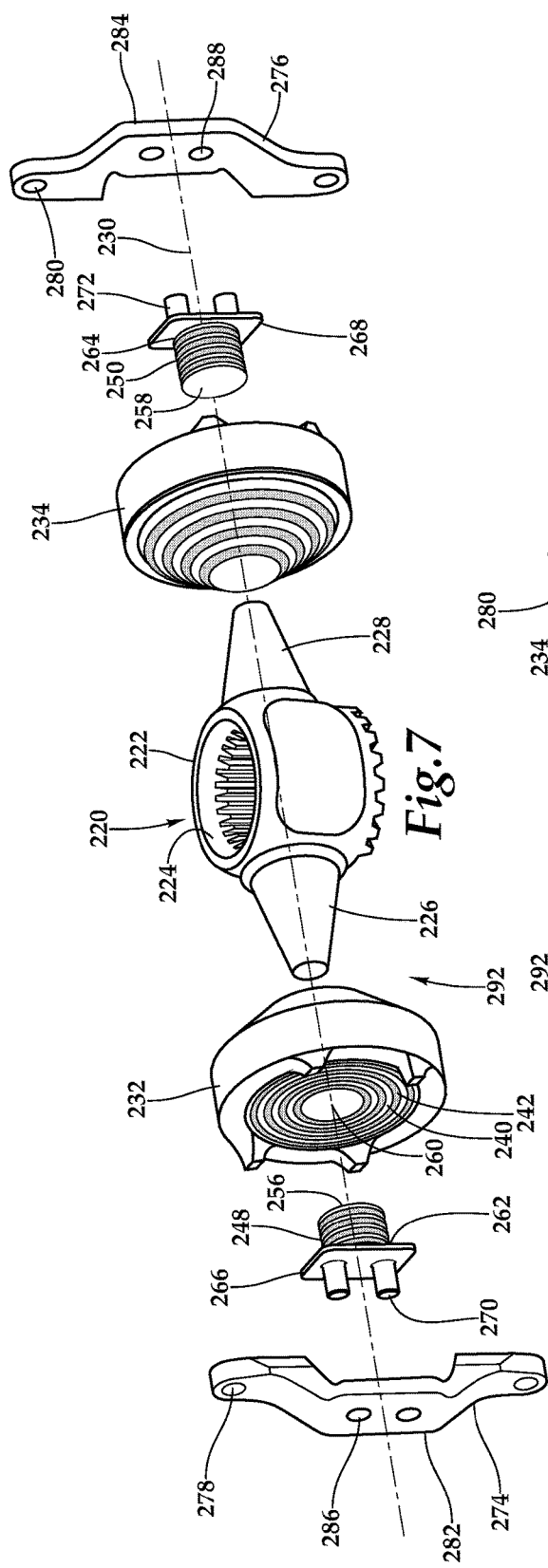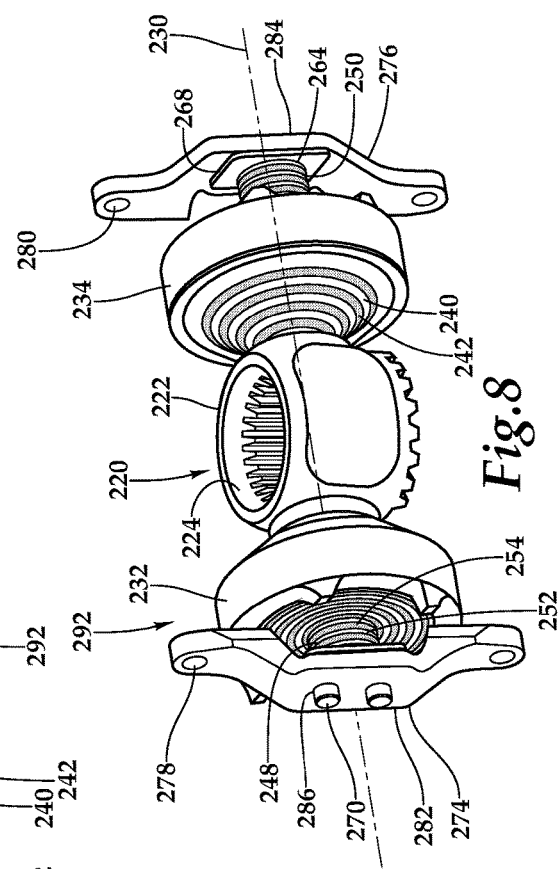

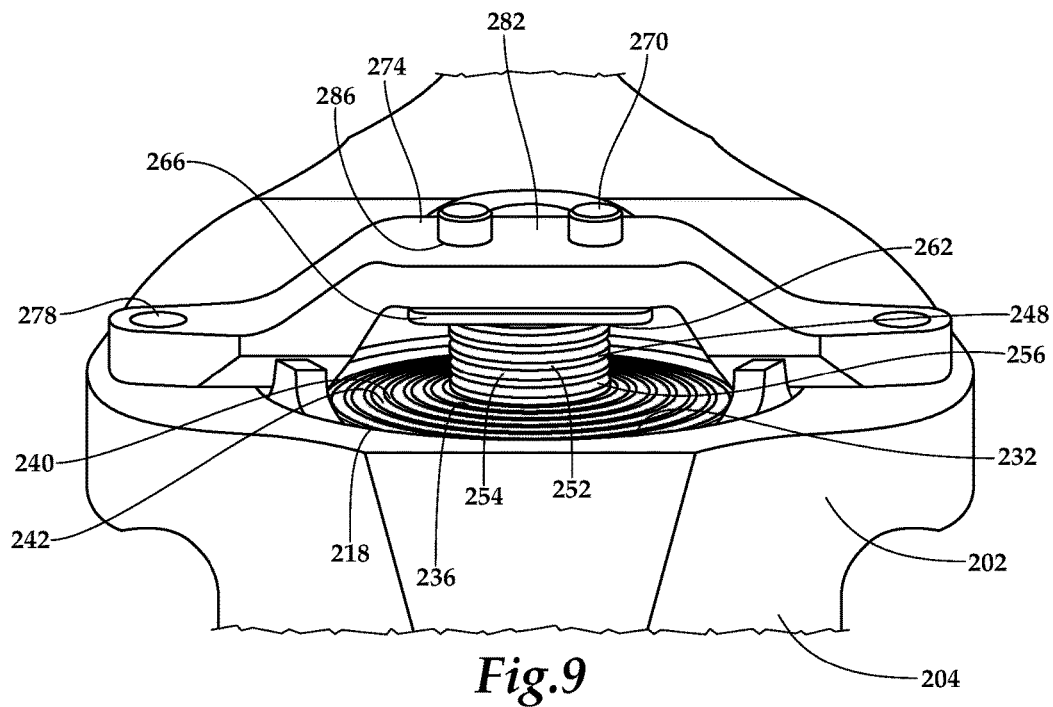
*Fig.9*
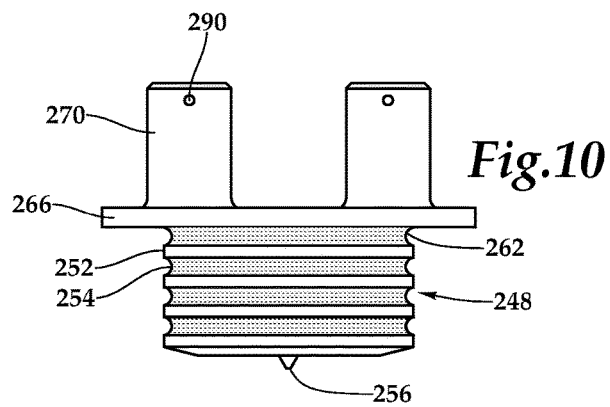
*Fig.10*
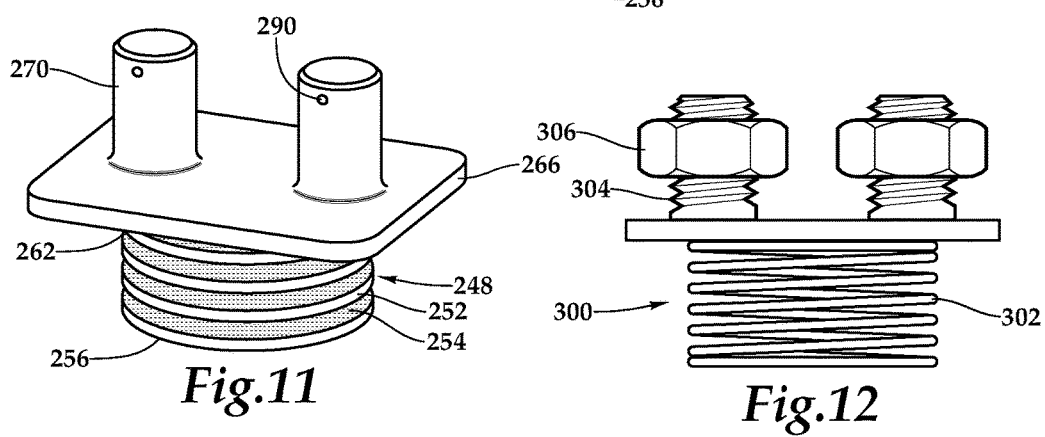
*Fig.11*
*Fig.12*

AXIAL SPRINGS FOR ROTOR HUB ASSEMBLY

TECHNICAL FIELD OF THE DISCLOSURE

The present disclosure relates, in general, to rotorcraft rotor hub assemblies and, in particular, to axial springs for use in rotorcraft rotor hub assemblies to reduce the axial movement of flapping bearings.

BACKGROUND

Rotorcraft rotor hub assemblies include rotor blades joined together by a yoke. It may be advantageous to allow a pair of oppositely disposed rotor blades to flap or teeter in a seesaw motion about a teetering axis while the rotor hub assembly is rotating. Such flapping may be regulated by a flapping bearing disposed in the yoke between the pair of rotor blades. The flapping bearing may have radial and torsional spring rates that accommodate asymmetrical thrust between the pair of rotor blades as well as any Coriolis torque. While the radial and torsional spring rates of the flapping bearing may be tailored for these purposes, the flapping bearing may also have a propensity to move or deform in an axial direction along the teetering axis. Such deformation in the axial direction may cause unwanted contact between the flapping bearing and other components, leading to accelerated wear and tear. Also, because flapping bearings are primarily used to accommodate radial and torsional loads, it may be difficult to vary the composition of the flapping bearing to accommodate axial deformation without also affecting the radial and torsional spring rates. Accordingly, a need has arisen for an axial spring that can be easily appended to a flapping bearing and whose properties can be custom tailored to regulate stiffness in a single, axial direction to minimize the drawbacks of current flapping bearings.

SUMMARY

In a first aspect, the present disclosure is directed to a rotor hub assembly for a rotorcraft. The rotor hub assembly includes a yoke forming a bearing bore and having a teetering axis extending through the bearing bore. A flapping bearing is disposed in the bearing bore and is operable to regulate teetering of the yoke about the teetering axis. An axial spring abuts the flapping bearing to reduce movement of the yoke along the teetering axis, thereby reducing movement of the flapping bearing along the teetering axis.

In some embodiments, the axial spring may include a plurality of alternating metallic and elastomeric layers such as a plurality of substantially circular alternating metallic and elastomeric layers. In certain embodiments, the yoke forms a mast bore adapted to receive the mast therethrough such that the mast may be substantially perpendicular to the teetering axis. In some embodiments, a retention bracket may be coupled to the yoke to secure the axial spring against the flapping bearing. In such embodiments, the retention bracket may have a raised central portion with at least one receiving hole that is adapted to receive at least one boss extending from an end cap on a distal end of the axial spring. The boss may include a safety hole adapted to receive a safety wire therethrough to prevent the boss from disengaging with the receiving hole of the retention bracket.

In certain embodiments, the yoke may be rotatable in a plane of rotation such that the teetering axis is disposed substantially along the plane of rotation. In some embodiments, the yoke may have a central portion and a pair of oppositely disposed end portions each coupled to one of the plurality of rotor blade assemblies. In certain embodiments, a flapping bearing assembly may be disposed in the bearing bore. The flapping bearing assembly may include a trunnion having a central mast bore and first and second trunnion arms extending outwardly therefrom substantially along the teetering axis with the flapping bearing disposed about the first trunnion arm and a second flapping bearing disposed about the second trunnion arm.

In a second aspect, the present disclosure is directed to a rotor hub assembly for a rotorcraft. The rotor hub assembly includes a yoke forming a bearing bore and having a plane of rotation and a teetering axis disposed substantially along the plane of rotation and extending through the bearing bore. A plurality of rotor blade assemblies are coupled to and rotatable with the yoke. A flapping bearing assembly is disposed in the bearing bore. The flapping bearing assembly includes a trunnion having a central mast bore, first and second trunnion arms extending outwardly therefrom substantially along the teetering axis and first and second flapping bearings disposed respectively about the first and second trunnion arms. The flapping bearings are operable to regulate teetering of the yoke about the teetering axis. First and second axial springs respectively abut the first and second flapping bearings and are operable to reduce movement of the yoke along the teetering axis, thereby reducing movement of the flapping bearings along the teetering axis.

In a third aspect, the present disclosure is directed to a rotorcraft. The rotorcraft includes a fuselage, a tailboom extending from the fuselage and a rotor hub assembly rotatably coupled to an aft portion of the tailboom. The rotor hub assembly includes a yoke forming a bearing bore and having a plane of rotation and a teetering axis disposed substantially along the plane of rotation and extending through the bearing bore. A plurality of rotor blade assemblies are coupled to and rotatable with the yoke. A flapping bearing assembly is disposed in the bearing bore. The flapping bearing assembly includes a trunnion having a central mast bore, first and second trunnion arms extending outwardly therefrom substantially along the teetering axis and first and second flapping bearings disposed respectively about the first and second trunnion arms. The flapping bearings are operable to regulate teetering of the yoke about the teetering axis. First and second axial springs respectively abut the first and second flapping bearings and are operable to reduce movement of the yoke along the teetering axis, thereby reducing movement of the flapping bearings along the teetering axis.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of an exemplary rotorcraft utilizing a bearing assembly in accordance with embodiments of the present disclosure;

FIGS. 2A-2C are schematic illustrations of an exemplary tail rotor in accordance with embodiments of the present disclosure;

FIG. 3 is a side view of a blade assembly in accordance with embodiments of the present disclosure;

FIG. 4 is a top view of a blade assembly in accordance with embodiments of the present disclosure;

FIG. 5 is an exploded view of a yoke and bearing assembly in accordance with embodiments of the present disclosure;

FIG. 6 is an isometric view of a yoke and bearing assembly in accordance with embodiments of the present disclosure;

FIG. 7 is an exploded view of a bearing assembly in accordance with embodiments of the present disclosure;

FIG. 8 is an isometric view of a bearing assembly in accordance with embodiments of the present disclosure;

FIG. 9 is an isometric view of an axial spring secured against a flapping bearing by a retention bracket in accordance with embodiments of the present disclosure;

FIG. 10 is a side view of an axial spring in accordance with embodiments of the present disclosure;

FIG. 11 is an isometric view of an axial spring in accordance with embodiments of the present disclosure; and FIG. 12 is a side view of an axial spring in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A and 1B in the drawings, a rotorcraft is schematically illustrated and generally designated 10. Rotorcraft 10 has a rotor hub assembly 12, which includes a plurality of rotor blade assemblies 14. Rotor hub assembly 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. A tailboom 20 extends from fuselage 16 and has an aft portion 22. A tail rotor 24 includes a tail rotor hub assembly 26 that is rotatably coupled to aft portion 22 of tailboom 20. As used herein, the term "coupled" may include direct or indirect coupling by any means, including moving and/or non-moving mechanical connections. Tail rotor 24 controls the yaw of rotorcraft 10. For example, tail rotor 24 may generate a thrust that counteracts the movement of fuselage 16 caused by the rotation of rotor hub assembly 12. Tail rotor hub assembly 26 includes a bearing assembly 28 that regulates teetering or flapping of rotor blade assemblies 30 about a teetering axis while also regulating bearing motion in the axial direction along the teetering axis. Unless otherwise indicated, as used herein, "or" does not require mutual exclusivity. Rotor blade assemblies 30 deviate from their plane of rotation when such flapping occurs. By regulating the manner in which rotor blade assemblies 30 flap, bearing assembly 28 assists in accommodating asymmetrical thrusts between rotor blade assemblies 30 as well as any Coriolis effect or torque. Bearing assembly 28, as described in the illustrative embodiments, may also be utilized in rotor hub assembly 12.

It should be appreciated that rotorcraft 10 is merely illustrative of a variety of aircraft that can implement the embodiments disclosed herein. Indeed, bearing assembly 28 may be utilized on any aircraft having a rotor. Other aircraft implementations can include hybrid aircraft, tiltrotor aircraft, tiltwing aircraft, quad tiltrotor aircraft, unmanned aircraft, gyrocopters, propeller-driven airplanes, jets and the like. As such, those skilled in the art will recognize that bearing assembly 28 can be integrated into a variety of aircraft configurations. It should be appreciated that even though aircraft are particularly well suited to implement the embodiments of the present disclosure, non-aircraft vehicles and devices can also implement the embodiments.

Referring to FIGS. 2A-2C, a tail rotor on which the illustrative embodiments may be implemented is schematically illustrated and generally designated 100. Tail rotor 100 is a non-limiting example of tail rotor 24 in FIG. 1A. Tail rotor 100 includes a mast 102 on which yokes 104, 106 are mounted. Mast bores 108, 110 are located at the center of each of yokes 104, 106, respectively, to receive mast 102. Yokes 104, 106 transfer drive torque to rotor blade assemblies 112a, 112b, 114a, 114b, respectively, react to rotor loads and transfer blade thrust to mast 102 through a bearing assembly (not shown). Yoke 104 and rotor blade assemblies 112a, 112b form blade assembly 116 and yoke 106 and rotor blade assemblies 114a, 114b form blade assembly 118. As best seen in FIG. 2C, blade assemblies 116, 118 are mounted on mast 102 at different angles so as to be angularly offset from one another. Tail rotor 100 includes a pitch control system 120, including a pitch control link assembly 122, to control the pitch of rotor blade assemblies 112a, 112b, 114a, 114b. Pitch control system 120 moves rotor blade assemblies 112a, 112b, 114a, 114b into positive or negative pitch angles so that tail rotor 100 generates thrust in sideward directions 124, 126. By varying the intensity and direction of thrust generated by rotor blade assemblies 112a, 112b, 114a, 114b, tail rotor 100 controls the moment of the tailboom and thus controls the yaw of the rotorcraft. The bearing assembly of the illustrative embodiments may be implemented on either or both of blade assemblies 116, 118. In other embodiments, tail rotor 100 includes only a single blade assembly so that tail rotor 100 is a two-bladed tail rotor.

Referring to FIGS. 3-11 in the drawings, a blade assembly utilizing a bearing assembly is schematically illustrated and generally designated 200. Yoke 202 includes a central portion 204 forming a mast bore 206 through which mast 208 is received. Yoke 202 also includes end portions 210, 212 that are oppositely disposed on central portion 204. Rotor blade assemblies 214, 216 are coupled to end portions 210, 212, respectively, and are oppositely disposed relative to one another to form a 180 degree angle.

As best seen in FIGS. 5-9, yoke 202 includes a bearing bore 218, substantially perpendicular to mast bore 206, in which a flapping bearing assembly 220 is disposed. Flapping bearing assembly 220 includes a trunnion 222 having a central mast bore 224 through which mast 208 is received. Trunnion 222 includes trunnion arms 226, 228 extending outwardly from trunnion 222 substantially along teetering axis 230. Trunnion arms 226, 228 have a generally conical shape in which they taper as they extend outwardly from trunnion 222. Flapping bearings 232, 234 are disposed about trunnion arms 226, 228, respectively. Flapping bearing 232 is disposed at end 236 of bearing bore 218 and flapping bearing 234 is disposed at end 238 of bearing bore 218. Each flapping bearing 232, 234 include circular and concentric rigid layers 240 and elastomeric layers 242 that radially alternate with one another. Rigid layers 240 may be formed from any rigid material, such as metal, and elastomeric layers 242 may be formed from any elastomeric material, such as rubber. Rigid and elastomeric layers 240, 242 allow for torsional movement about teetering axis 230 to permit flapping or teetering of blade assembly 200, including yoke 202, about teetering axis 230.

As shown in FIG. 3, the flapping motion of blade assembly 200 is indicated by directional arrows 244. Teetering axis 230 extends through, and is substantially parallel with, bearing bore 218 such that mast 208 is substantially perpendicular to teetering axis 230. As best seen in FIG. 4, blade assembly 200, including yoke 202, are rotatable in a plane of rotation indicated by arrows 246, and teetering axis 230 is disposed substantially along the plane of rotation. Flapping bearings 232, 234 have a torsional and radial stiffness or spring rate to regulate teetering of blade assembly 200 about teetering axis 230. Flapping bearings 232, 234 accommodate flapping motions 244 and forces to provide various mechanical and operational benefits, and flapping bearing assembly 220 provides load paths for rotor torque and thrust.

In addition to allowing for torsional and radial movement, flapping bearings 232, 234 may also be susceptible to axial movement or deformation along teetering axis 230. Such axial movement may be caused by the malleable nature of elastomeric layers 242, and may present a number of operational difficulties. For example, flapping bearings 232, 234 may come into unwanted physical contact with components at or near ends 236, 238 of bearing bore 218, which can lead to the damage of such components. Axial springs 248, 250 may be included in flapping bearing assembly 220 to reduce the movement of flapping bearings 232, 234 along teetering axis 230, thereby solving the aforementioned problems. By abutting flapping bearings 232, 234 along teetering axis 230, axial springs 248, 250 adjust the axial spring rate of flapping bearings 232, 234 by stiffening their movement along teetering axis 230.

As best seen in FIGS. 10 and 11, axial spring 248 includes alternating metallic layers 252, or shims, and elastomeric layers 254. Metallic layers 252 may be formed from any metal, and elastomeric layers 254 may be any elastomeric material, such as rubber. In other embodiments, metallic layers 252 may alternatively be formed from a non-metallic, rigid material. In the illustrated embodiment, metallic and elastomeric layers 252, 254 are bonded with one another. Each of the metallic and elastomeric layers 252, 254 have a generally circular shape, although in other embodiments metallic and elastomeric layers 252, 254 may have a different shape, such as a rectangular or elliptical shape. The quantity and size of each of metallic and elastomeric layers 252, 254 may be determined by the axial stiffness required of flapping bearings 232, 234 for the particular application. Stacked atop one another, metallic and elastomeric layers 252, 254 may have a total length on the order of millimeters to inches depending on the application. Proximal ends 256, 258 of axial springs 248, 250 abut the substantial centers 260 of flapping bearings 232, 234. The interface between proximal ends 256, 258 of axial springs 248, 250 and centers 260 of flapping bearings 232, 234 may be bonded or non-bonded. In other embodiments, axial springs 248, 250 may be pre-molded with, and thereby fixedly coupled to, flapping bearings 232, 234.

Distal ends 262, 264 of axial springs 248, 250 include end caps 266, 268, respectively, which may be formed from any rigid or metal material. End caps 266, 268 are interposed between retention brackets 274, 276 and axial springs 248, 250, respectively. End caps 266, 268 each include one or more bosses 270, 272. Retention brackets 274, 276, which may be coupled to yoke 202 via attachment holes 278, 280, secure axial springs 248, 250 against flapping bearings 232, 234, respectively. Retention brackets 274, 276 each have a raised central portion 282, 284 to provide additional room for axial springs 248, 250, respectively, and prevent the axial movement of flapping bearings 232, 234 along teetering axis 230 from interfering with retention brackets 274, 276 or other components. Raised central portions 282, 284 of retention brackets 274, 276 include one or more receiving holes 286, 288 into which bosses 270, 272 are insertable to further secure axial springs 248, 250, respectively. Retention brackets 274, 276 abut end caps 266, 268 when retention brackets 274, 276 are attached to yoke 202 and secure axial springs 248, 250 against flapping bearings 232, 234, respectively. A peelable shim (not shown), of any size, may be placed between retention brackets 274, 276 and end caps 266, 268 to customize the preload on axial springs 248, 250. As best seen in FIGS. 10 and 11, bosses 270, 272 may include one or more safety holes 290 that are adapted to receive a safety wire or pin to prevent bosses 270, 272 from disengaging with receiving holes 286, 288, respectively. If a portion of axial springs 248, 250 fail or break off during flight, safety holes 290 and safety wire prevents the remaining, non-failing portion of axial springs 248, 250, such as end caps 266, 268, from disengaging with retention brackets 274, 276 and possibly causing damage to the tail rotor hub assembly.

Axial springs 248, 250 increase the stiffness of flapping bearings 232, 234 in the axial direction along teetering axis 230 to prevent flapping bearings 232, 234 from physically contacting other components, as well as to prevent other problems. Because flapping bearings 232, 234 are able to move in the torsional, radial and axial directions, the introduction of axial springs 248, 250 into bearing assembly 292 allows flapping bearings 232, 234 to be more precisely customized in the torsional and radial dimensions, while allowing for some error in the axial direction remedied by axial springs 248, 250. Thus, instead of having to redesign flapping bearings 232, 234, axial springs 248, 250 increase the axial stiffness of existing, possibly non-perfect flapping bearings 232, 234, which avoids the need to change tooling on existing high cost parts and reduces cost. Axial springs 248, 250 may also be retrofitted on existing flapping bearings 232, 234, such as 429 T/R flapping bearings. Axial springs 248, 250 may be useful in situations in which it is difficult or undesirable to make a flapping bearing having the exact axial, radial and torsional stiffness values required by the application. By incorporating axial springs 248, 250 to account for axial loads, flapping bearings 232, 234 can be tuned to focus on radial and torsional load requirements to allow for a more specialized and effective bearing. Axial springs 248, 250 may also provide more stiffness in the axial direction to avoid or reduce resonances during flight. Because axial springs 248, 250 may be quickly and easily designed, produced and installed, they present a more cost and time effective solution than redesigning, reproducing and reinstalling flapping bearings 232, 234.

Referring back to FIGS. 3 and 4, it will be appreciated by one of ordinary skill in the art that the illustrative embodiments may be implemented on blade assemblies in which rotor blade assemblies 214, 216 form an angle of less than 180 degrees. Axial springs 248, 250 may also be utilized on blade assemblies that contain more than two rotor blade assemblies. Blade assembly 200, including rotor blade assemblies 214, 216, form a spanwise axis 294 that forms an angle 296 with teetering axis 230. Angle 296 may be any angle, such as 90 degrees, 40 degrees, an acute angle of less than 60 degrees or another angle suitable for the application. Bearing assembly 292 may be utilized on any number of yokes attached to mast 208. For example, bearing assembly 292 may be utilized in two separate yokes stacked atop one another on a single mast as shown in FIGS. 2A-2C.

Referring to FIG. 12 in the drawings, an axial spring is schematically illustrated and generally designated 300. Axial spring 300, instead of using a plurality of alternating metallic and elastomeric layers, utilizes a coiled spring 302 to provide axial stiffness to a flapping bearing. In other embodiments, axial spring 300 may be a single elastomeric block or layer, not including any metallic shims, which provides an axial spring rate. Axial spring 300 also includes threaded bolts 304 that may be inserted into the receiving holes of a retention bracket and secured by nuts 306.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor hub assembly for a rotorcraft comprising:
a yoke forming a bearing bore, the yoke having a teetering axis extending through the bearing bore;
a flapping bearing disposed in the bearing bore, the flapping bearing operable to regulate teetering of the yoke about the teetering axis;
an axial spring abutting the flapping bearing, thereby reducing movement of the flapping bearing along the teetering axis; and
a retention bracket adapted to secure the axial spring against the flapping bearing, the retention bracket including at least one receiving hole;
wherein the axial spring further comprises a distal end having an end cap adapted to abut the retention bracket, the end cap structurally separable from the retention bracket and the end cap including at least one boss insertable into the at least one receiving hole of the retention bracket.

2. The rotor hub assembly as recited in claim 1 wherein the axial spring further comprises a plurality of alternating metallic and elastomeric layers.

3. The rotor hub assembly as recited in claim 1 wherein the axial spring further comprises a plurality of substantially circular metallic and elastomeric bodies arranged in alternating layers.

4. The rotor hub assembly as recited in claim 1 further comprising:
a mast;
wherein, the yoke forms a mast bore adapted to receive the mast therethrough; and
wherein, the mast is substantially perpendicular to the teetering axis.

5. The rotor hub assembly as recited in claim 1 wherein the retention bracket is adapted to be coupled to the yoke.

6. The rotor hub assembly as recited in claim 1 wherein the retention bracket further comprises a raised central portion.

7. The rotor hub assembly as recited in claim 1 wherein the at least one boss further comprises a safety hole adapted to receive a safety wire to prevent the at least one boss from disengaging with the at least one receiving hole.

8. The rotor hub assembly as recited in claim 1 wherein the yoke is rotatable in a plane of rotation; and
wherein the teetering axis is disposed substantially along the plane of rotation.

9. The rotor hub assembly as recited in claim 1 further comprising:
a flapping bearing assembly disposed in the bearing bore comprising:
a trunnion having a central mast bore and first and second trunnion arms extending outwardly therefrom substantially along the teetering axis;
the flapping bearing disposed about the first trunnion arm; and
a second flapping bearing disposed about the second trunnion arm.

10. The rotor hub assembly as recited in claim 1 further comprising:
a plurality of rotor blade assemblies coupled to the yoke.

11. The rotor hub assembly as recited in claim 10 wherein the yoke further comprises a central portion and a pair of oppositely disposed end portions, the pair of oppositely disposed end portions each coupled to one of the plurality of rotor blade assemblies.

12. A rotor hub assembly for a rotorcraft comprising:
a yoke forming a bearing bore, the yoke having a plane of rotation and a teetering axis disposed substantially along the plane of rotation and extending through the bearing bore;
a plurality of rotor blade assemblies coupled to and rotatable with the yoke;
a flapping bearing assembly disposed in the bearing bore, the flapping bearing assembly including a trunnion having a central mast bore, first and second trunnion arms extending outwardly therefrom substantially along the teetering axis and first and second flapping bearings disposed respectively about the first and second trunnion arms, the flapping bearings operable to regulate teetering of the yoke about the teetering axis;

first and second axial springs respectively abutting the first and second flapping bearings operable to reduce movement of the yoke along the teetering axis, thereby reducing movement of the flapping bearings along the teetering axis; and first and second retention brackets coupled to the yoke and respectively securing the first and second axial springs against the first and second flapping bearings, each retention bracket including a pair of receiving holes;

wherein the first and second axial springs each further comprise a distal end having an end cap adapted to abut a respective one of the retention brackets, each end cap structurally separable from the respective retention bracket and each end cap including a pair of bosses that are insertable into the pair of receiving holes of the respective retention bracket.

13. The rotor hub assembly as recited in claim 12 wherein each of the axial springs further comprises a plurality of alternating metallic and elastomeric layers.

14. The rotor hub assembly as recited in claim 12 wherein each of the axial springs further comprises a plurality of substantially circular metallic and elastomeric bodies arranged in alternating layers.

15. A rotorcraft comprising:

a fuselage;

a tailboom extending from the fuselage, the tailboom having an aft portion; and a rotor hub assembly rotatably coupled to the aft portion of the tailboom, the rotor hub assembly comprising:

a yoke forming a bearing bore, the yoke having a plane of rotation and a teetering axis disposed substantially along the plane of rotation and extending through the bearing bore;

a plurality of rotor blade assemblies coupled to and rotatable with the yoke;

a flapping bearing assembly disposed in the bearing bore, the flapping bearing assembly including a trunnion having a central mast bore, first and second trunnion arms extending outwardly therefrom substantially along the teetering axis and first and second flapping bearings disposed respectively about the first and second trunnion arms, the flapping bearings operable to regulate teetering of the yoke about the teetering axis;

first and second axial springs respectively abutting the first and second flapping bearings operable to reduce movement of the yoke along the teetering axis, thereby reducing movement of the flapping bearings along the teetering axis; and first and second retention brackets coupled to the yoke and respectively securing the first and second axial springs against the first and second flapping bearings, each retention bracket including a pair of receiving holes;

wherein the first and second axial springs each further comprise a distal end having an end cap adapted to abut a respective one of the retention brackets, each end cap structurally separable from the respective retention bracket and each end cap including a pair of bosses that are insertable into the pair of receiving holes of the respective retention bracket.

* * * * *